(12) United States Patent
Shumake, Jr. et al.

(10) Patent No.: US 6,253,785 B1
(45) Date of Patent: Jul. 3, 2001

(54) AUTOMATIC LEAK SHUTOFF DEVICE

(76) Inventors: Carlis L. Shumake, Jr., 4106 Arapaho Ct., Powder Springs, GA (US) 30127-5024; Wallace M. Sumner, 1697 Hillside St., Marietta, GA (US) 30066-4194

( * ) Notice: Subject to any disclaimer, the term of this patent is extended or adjusted under 35 U.S.C. 154(b) by 0 days.

(21) Appl. No.: 09/664,455

(22) Filed: Sep. 18, 2000

(51) Int. Cl.[7] .............................. F16K 31/32; F16K 33/00
(52) U.S. Cl. ..................... 137/312; 122/504; 122/507; 137/421; 137/422; 137/429; 251/65; 251/74; 251/76; 251/77
(58) Field of Search .................................. 137/312, 416, 137/422, 429, 430, 420, 421; 122/504.2, 507; 251/65, 76, 74, 77

(56) References Cited

U.S. PATENT DOCUMENTS

| | | | |
|---|---|---|---|
| 2,724,401 | 11/1955 | Page | 137/403 |
| 2,765,805 | * 10/1956 | Guyton | 251/76 |
| 2,798,503 | 7/1957 | Carver | 137/67 |
| 3,473,553 | 10/1969 | Collins | 137/312 |
| 3,556,467 | * 1/1971 | Ziccardi | 251/76 |
| 3,766,936 | * 10/1973 | O'Mera | 137/312 |
| 3,770,002 | 11/1973 | Brown | 137/312 |
| 3,920,031 | * 11/1975 | Maxfield | 137/67 |
| 4,805,662 | 2/1989 | Moody | 137/312 |
| 4,836,239 | * 6/1989 | Kinkead | 137/429 |
| 4,877,049 | * 10/1989 | Fornasari | 137/312 |
| 4,909,274 | 3/1990 | Rodriguez | 137/312 |
| 5,008,650 | 4/1991 | Hoiberg | 340/604 |
| 5,632,302 | 5/1997 | Lenoir | 137/312 |
| 5,771,916 | * 6/1998 | Armenia et al. | 137/67 |
| 5,992,443 | 11/1999 | Rodriguez | 137/312 |
| 6,021,808 | 2/2000 | Dulac | 137/487 |
| 6,024,116 | 2/2000 | Almberg | 137/312 |

* cited by examiner

Primary Examiner—George L. Walton

(57) ABSTRACT

A water supply shutoff valve system is used with a fluid storage tank, such as a hot water heater, to automatically shut off the water supply to the storage tank as a result of leak containment which in turn causes a magnetic float to rise and consequently produce the mechanical force necessary to release and close a spring loaded water supply valve.

2 Claims, 3 Drawing Sheets

AUTOMATIC LEAK SHUTOFF DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND—FIELD OF THE INVENTION

This invention relates to a fluid supply shut-off valve system used to shut off the supply of fluid to a hot water heater when a leak or rupture is detected.

BACKGROUND—DESCRIPTION OF PRIOR ART

Hot water heaters are well known for the property damage that can result from an unattended leak or rupture. To minimize the damage resulting from leakage, numerous designs have been created for fluid supply shut-off valve systems. These designs involve different types of shut-off valves that close when activated or actuated by various means of leak detection. Prior art U.S. Pat. No. 4,909,274 is one such design. That design operates by containing the leaking fluid which raises a float and rod assembly and causes a set of gears to close a valve thus shutting off the supply of water to the water heater. That particular design requires no electrical power but is not economical to manufacture and is also impractical to install and operate.

Prior art U.S. Pat. No. 6,021,808 uses pressure differential that occurs during a rupture to close a shut-off valve. That design is not economical to manufacture, requires maintenance due to its daily moving parts, and may not work under a drip-type leak scenario.

Still, several other prior arts such as U.S. Pat. Nos. 3,770,002, 4,805,662, 5,008,650, 5,632,302, 5,992,443, and 6,024,116 use various means of leak detection to cause an electrically operated shut-off valve to close. These designs are also uneconomical and require electrical power in order to operate. Accordingly a need exists for a device to shut off the supply of water to a water heater during a leak or rupture that is economical to manufacture and install, simple and reliable to operate, requires minimum maintenance, and requires no electrical power. The invention disclosed herewith accomplishes said criteria

BRIEF SUMMARY OF THE INVENTION

The present invention involves the collection of water resulting from a leak or rupture at a water heater or the like. The leaking water is collected in a leak collection pan that is located beneath a water heater. A float containing a permanent magnet is located in the leak collection pan. Upon reaching a predetermined water level in the leak collection pan, the magnetic float and a rigidly attached vertical float rod rise and slowly enter the magnetic field developing between the top of the magnetic float and both the bottom of the water heater as well as a magnetic attractive float stop. The stationary float stop is located adjacent to the outside bottom jacket of the water heater. The magnetic float and its float rod are accelerated quickly upward due to the magnetic force. The top end of the float rod strikes the bottom end of a vertical lift rod with a predetermined force. Upon said impact of force the lift rod is quickly forced upward and causes the release and closing of a spring loaded quarter-turn ball valve. The closure of the ball valve shuts off the supply of water to the water heater. A check valve in the outgoing hot water heater line then automatically closes due to a no flow condition and prevents any back flow drainage.

The resulting property damage is minimized due to the automatic shut off of the water supply to the water heater and the check valve's prevention of any back flow drainage.

Several objects and advantages exist with the present invention. One such advantage of our invention is that there are no personnel safety hazard concerns regarding electrical shock with water contact as this invention requires no electrical power in order to operate. Another advantage over the prior art is that the present invention performs even during a power outage.

This invention is constructed of simple materials and hardware that can be found in a typical hardware store. No newly designed or newly manufactured valve or other major component is required. Standard "off the shelf" hardware, valves, and magnet are used in the construction of this invention. Hence, minimal initial capital is required for tooling and production.

The simplicity of this invention is clearly an advantage over prior art such that a typical home owner could easily understand, purchase, install, and operate this invention.

Figure 1:
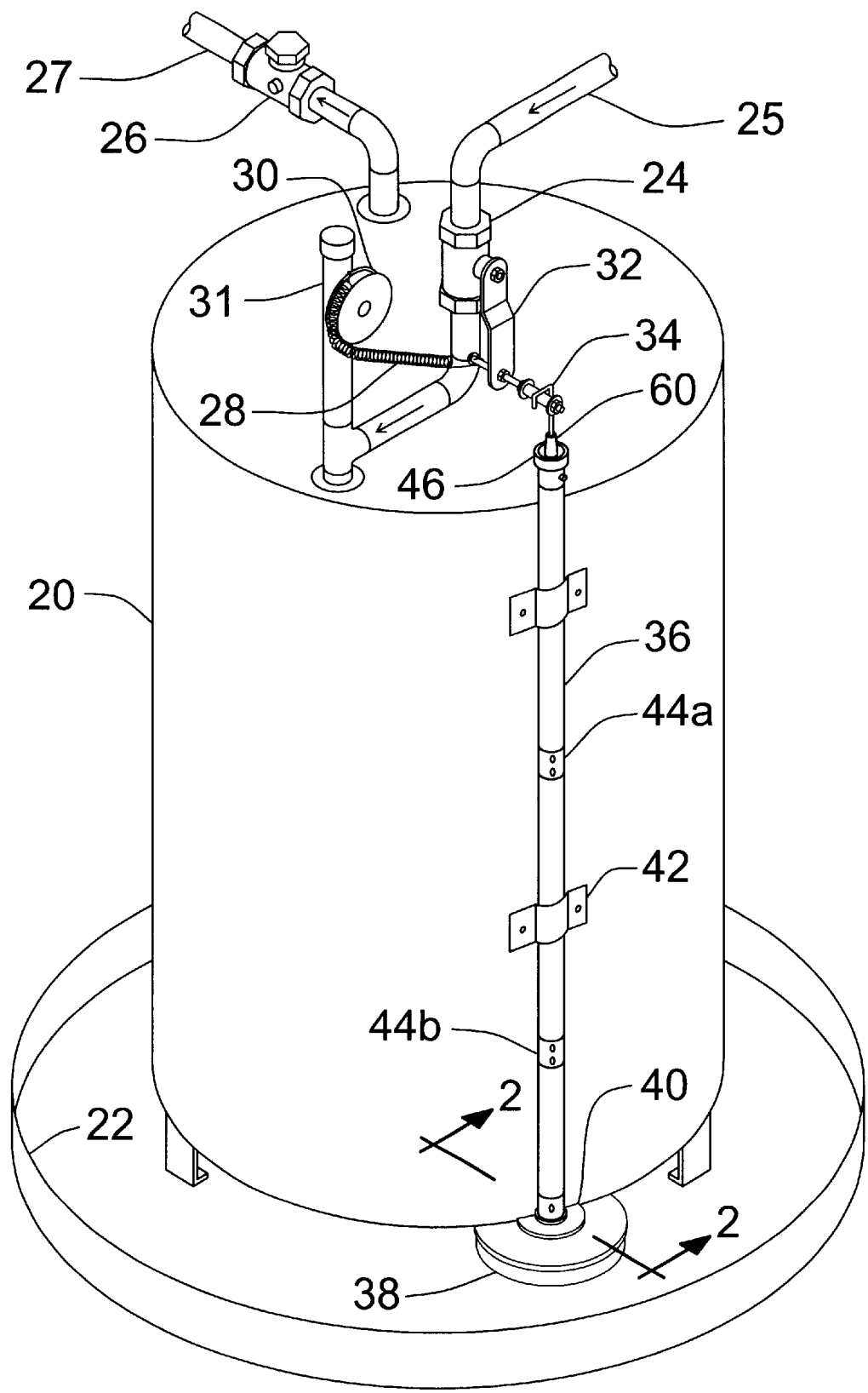
FIG. 1 is a perspective view of the present invention as would be typically installed on a water heater in the normal operating position.

REFERENCE NUMERALS IN DRAWINGS 20 water heater
22 leak collection pan
24 ball valve
25 water supply line
26 check valve
27 outgoing hot water line
28 spring
30 spring wheel
31 capped riser pipe
32 valve lever arm
34 lift rod
36 lift rod housing
38 magnetic float
38a top float piece
38b bottom float piece
40 float stop
42 housing clamp
44a coupling; 44b coupling
46 end connector
48a magnet casing
48b permanent magnet
50 float rod
52 required rod gap
54 nut 56 tee nut
58 nut
60 tee nut/guide
62 lever bolt
64a nut; 64b nut; 64c nut, 64d nut
66a washer; 66b washer
68 roller/spacer

DETAILED DESCRIPTION OF THE INVENTION

FIG. 1 shows a typical water heater 20 located above a leak collection pan 22. A quarter-turn ball valve 24 is shown installed in an incoming water supply line 25. The ball valve is shown in the normally open position. A check valve 26 is shown installed in an outgoing hot water fine 27. Check valve 26 is shown in the normally open position as water passes through ball valve 24, into water heater 20, and comes out as hot water through outgoing hot water line 27.

An adjustable spring wheel 30, such as a pulley, maintains tension on spring 28 whose opposite end is attached to a valve lever arm 32. A hooked end of a lift rod 34 keeps lever arm 32 from turning 90 degrees and closing ball valve 24 against the predetermined set tension of spring 28.

Lift rod 34 is vertically guided in a tubular lift rod housing 36, such as an electrical conduit. Lift rod 34 is guided using washer-containing conduit couplings 44a and 44b, and a tee nut/guide 60. Lift rod housing 36 is attached to the outside jacket of the water heater using a plurality of housing clamps 42, such as conduit clamps. Lift rod housing 36 is assembled using a magnetically attractive float stop 40 on its bottom end, such as a partial iron floor flange, and an end connector 46 on its top end. Coupling 44a and coupling 44b are also used to adjust the overall length and placement of lift rod housing 36 during installation.

FIG. 1 also shows a magnetic float 38 in its normal operating position centered below lift rod housing 36 and resting on the inside bottom of leak collection pan 22. Once sufficient leak water is collected in the leak collection pan 22, magnetic float 38 will begin to rise upward toward the center of float stop 40.

Figure 2:
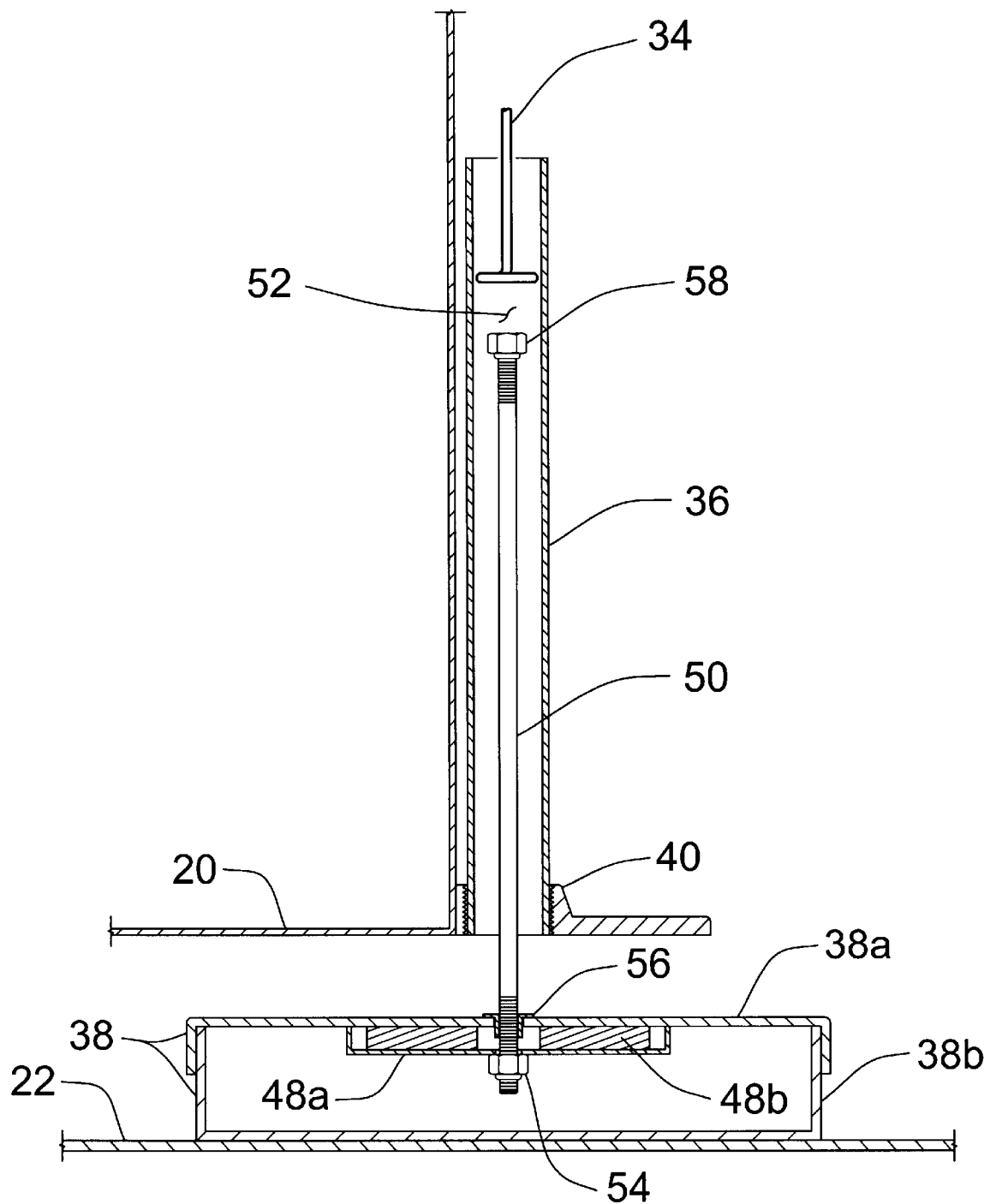
FIG. 2 is a cross-sectional view of the present invention depicting the float, magnet, float rod and lift rod assembly in the normal operating position.

FIG. 2 is a cross-sectional view of a magnetic float 38, a float rod 50, and a lift rod 34. A magnetic float 38, such as a candy tin, is constructed of top float piece 38a, and of bottom float piece 38b. A shallow pot ceramic permanent magnet 48b is attached to its magnet casing 48a. Magnet casing 48a is attached to top float piece 38a using a nut 54 and a tee nut 56 on a threaded end of aluminum float rod 50.

As the collected leak water rises, magnetic float 38 rises toward the bottom of the water heater and float stop 40. Once the magnetic attraction between magnetic float 38 and the bottom of the water heater and float stop 40 is maximized, magnetic float 38 will quickly accelerate upward, displacing the required rod gap 52, until it stops on simultaneous impact with the bottom of the water heater, float stop 40, and lift rod 34. A nut 58 helps transmit maximum impact force on the blunt end of lift rod 34.

Figure 3:
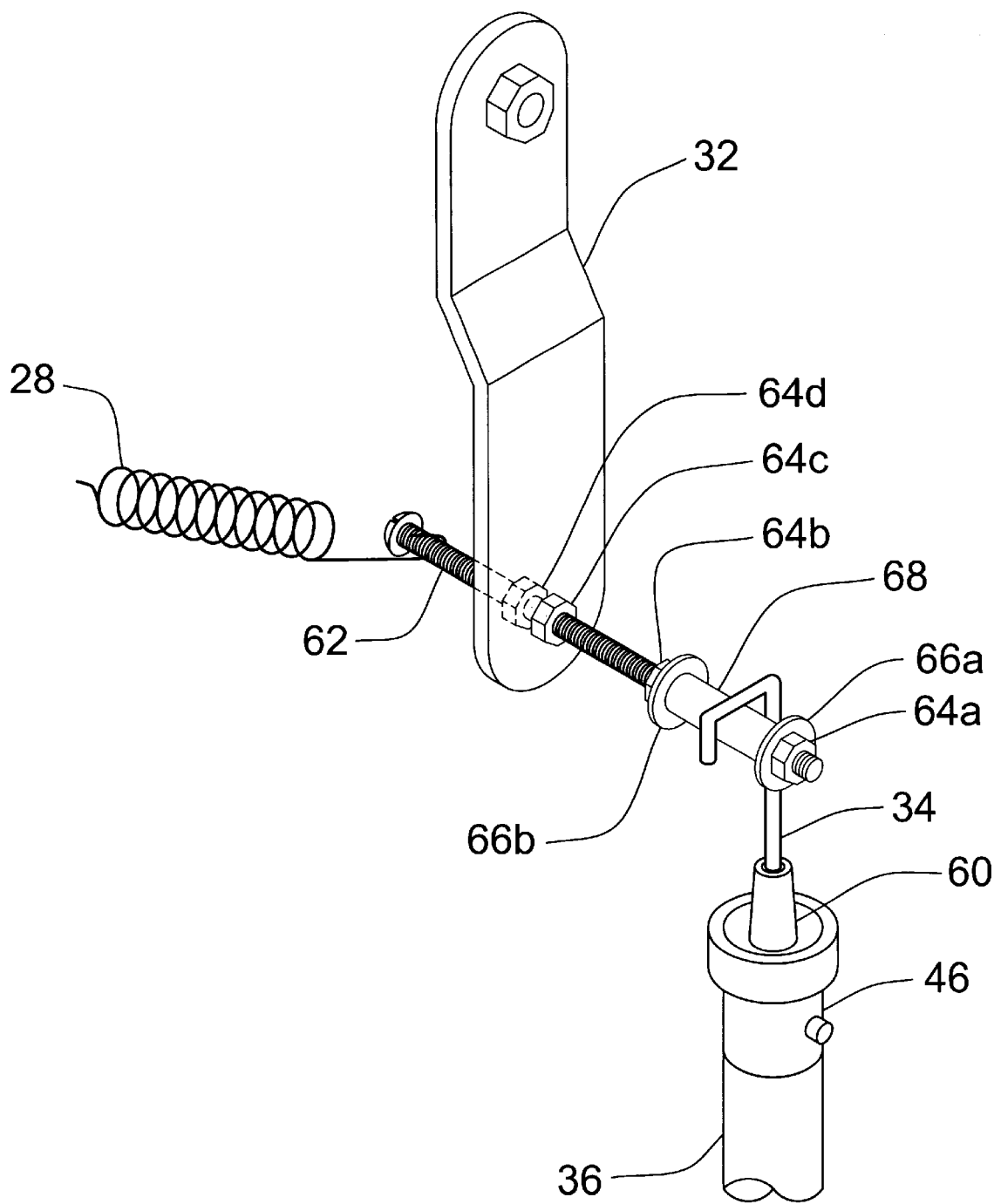
FIG. 3 is a perspective detail of the valve lever arm assembly, according to the present invention, showing the incoming water supply ball valve lever arm in the normal operating spring-loaded position that is maintained by the hooked end of the lift rod.

FIG. 3 shows ball valve lever arm 32 in the normal operating spring-loaded position. A spring 28 maintains predetermined constant tension on valve lever arm 32. The end of lever arm 32 has a hole drilled through it in order to accommodate a lever bolt 62. Lever bolt 62 is secured to valve lever arm 32 with a nut 64c and a nut 64d. One end of spring 28 is then hooked over the head shaft end of lever bolt 62. The opposite end of lever bolt 62 is comprised of a cylindrical roller/spacer 68. Said roller/spacer 68 is secured in place, but free to roll, by a washer 66a and a nut 64a. A washer 66b and a nut 64b are used on the opposite end of roller/spacer 68.

The hook end of lift rod 34 is hooked over roller/spacer 68 and maintains spring 28 position and tension. Spring 28 is attached to spring wheel 30, in FIG. 1, which can be turned either clockwise or counterclockwise in order to increase or decrease spring tension. Spring wheel 30 is attached to capped riser pipe 31 and can be adjusted to slide vertically up or down in order to accommodate the closing arc path of valve lever arm 32.

When lift rod 34 receives the impact force from float rod 50, in FIG. 2, lift rod 34 with the assistance of roller/spacer 68, FIG. 3, travels upward and then frees valve lever arm 32 to yield to the tension of spring 28 thus closing ball valve 24, FIG. 1. Said closing of ball valve 24 shuts off the incoming water supply from water supply line 25.

At this stage there is no flow entering the inlet nozzle of the water heater. Consequently there is no flow leaving the water heater through outgoing hot water line 27. Under said condition check valve 26 automatically closes preventing any back flow drainage.

At this point there is no hot water service available until the system is repaired and spring 28, valve lever arm 32, lift rod 34, float rod 50, and magnetic float 38 are manually placed back into the normal operating position.

RAMIFICATIONS

The reader will see the simplicity, reliability and inexpensive cost associated with this invention as used at a water heater as shown in the drawings. However this invention is not limited to only water heater applications. This invention can be applied similarly at water storage tanks, washing machines, drinking fountains, or confined areas such as basements.

This particular water heater application uses a leak collection pan. Other applications would not necessarily require a pan. A shallow sump or a curbed area that would retain leakage sufficient to cause the required float lift would suffice. Example: A shallow sump or a curbed area could be used in a basement to collect leakage from leaking equipment or ruptured/frozen water lines eliminating the need of a leak collection pan. If the device was located in the low point of a basement, neither a leak collection pan, sump or a curbed area would be required.

The present invention can be used on existing hot water heater installations as well as new installations. Optionally a water heater manufacturer could incorporate this invention during equipment fabrication such that the device is built internally within the water heater jacket, or fabricated as such to easily accept the later addition of the device. This invention could be supplied as part of the water heater equipment proper or as an add-on assembly kit.

A removable protective housing could be attached to shield the magnetic float from incidental contact with foreign objects that might otherwise cause the float to operate improperly. Ramifications include safely directing a water heater's temperature and pressure relief valve discharge line into the leak collection pan. This discharge would cause the required float movement and consequent bad valve closure. Although there might not be an actual water leak, this ball valve closure indicates to the owner that there might be a serious water heater operating malfunction and potential safety hazard.

We claim:

1. A fluid supply shut off valve system comprising:
   (a) a water inlet pipe originating from a water source;
   (b) a valve with said water inlet pipe entering and exiting, thus supplying water to a water user device such as an appliance or storage tank;
   (c) A lever arm of said valve, under sprig tension biased to close valve upon activation of a spring tension release trigger mechanism;
   (d) a fluid leak containment area with means for collecting and confining leaking fluid from said water user device;
   (e) a float containing a permanent magnet whereby said magnetic float is located within said fluid leak containment area and positioned beneath the underside of a magnetic attractive surface of said water user device;
   (f) a float stem one end of which attaches to and extends vertically upward from said float;
   (g) a lift rod one end of which is located vertically above said float stem, and an opposite end positioned at said spring tension release trigger mechanism;
   (h) a lost motion space exist between an end of said float stem and an end of said lift rod, that when displaced allows for impact forcing said lift rod to move vertically upward; and
   (i) a predetermined level of leaking fluid, collecting in said fluid leak containment area, causing said float to move vertically upward and enter a magnetic attractive field developed between said float and said magnetic attractive surface, thus allowing said float to accelerate upward such that said lost motion space is displaced by said float stem thus creating an impact generating a force that causes said lift rod to move vertically upward and activate said spring release trigger mechanism, which then releases spring tension upon said valve lever arm, which in turn allows automatic valve closure of said valve, thus shutting off the supply of water to said water user device.

2. A fluid supply shut off valve system comprising an alternative float and permanent magnet assembly of claim 1 whereby a float, containing no magnet, is magnetically attractive to a permanent magnet that is positioned above said float and beneath the underside surface of said water user device.

* * * * *